(12) United States Patent
Chen et al.

(10) Patent No.: US 8,111,256 B2
(45) Date of Patent: Feb. 7, 2012

(54) METHOD OF ALTERING A MESH MODEL USING MODEL INDEPENDENT DIRICHLET PARAMETRIZATION

(75) Inventors: Yifan Chen, Ann Arbor, MI (US); Basavaraj Tonshal, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 1002 days.

(21) Appl. No.: 12/045,881

(22) Filed: Mar. 11, 2008

(65) Prior Publication Data
US 2009/0231334 A1    Sep. 17, 2009

(51) Int. Cl.
*G06T 15/30*    (2011.01)
(52) U.S. Cl. .................. 345/423; 345/581; 345/419
(58) Field of Classification Search .............. 345/419, 345/423, 581
See application file for complete search history.

(56) References Cited

U.S. PATENT DOCUMENTS

| | | | |
|---|---|---|---|
| 4,821,214 A | | 4/1989 | Sederberg |
| 5,333,248 A | * | 7/1994 | Christensen ............. 345/442 |
| 5,504,845 A | | 4/1996 | Vecchione |
| 5,731,816 A | | 3/1998 | Stewart et al. |
| 5,903,458 A | | 5/1999 | Stewart et al. |
| 6,204,860 B1 | | 3/2001 | Singh |
| 2004/0085311 A1 | | 5/2004 | Lee et al. |
| 2005/0248562 A1 | | 11/2005 | Maystrovsky et al. |

OTHER PUBLICATIONS

Chen, Yifan, Basavaraj Tonshal, and Ali Saeed. "Geometric Surface Features Applied to Volumetric CAE Mesh Models." 31st Design Automation Conference: Presented at [the] 2005 ASME International Design Engineering Technical Conferences and Computers and Information in Engineering Conference. vol. 2. New York, NY: American Society of Mechanical Engine.*

Marsan, Anne L., Yifan Chen, and Paul J. Stewart. "Surface Feature Parametrization Analogous to Conductive Heat Flow." Journal of Computing and Information Science in Engineering 2.2 (2002): 77-85.*

Marsan, Anne L., Yifan Chen, and Paul Stewart. "A Finite Element Approach to Direct Surface Manipulation." Proceedings of DETC'01: ASME 2001 Design Engineering Technical Conferences and Computers and Information in Engineering Conference (Sep. 2001): 1-9.*

* cited by examiner

*Primary Examiner* — Xiao M. Wu
*Assistant Examiner* — Scott E Sonners
(74) *Attorney, Agent, or Firm* — Tung & Associates; Raymond Coppiellie, Esq.

(57) ABSTRACT

A method of altering a computer generated mesh model of a design feature by a computer user to improve a feature design process is provided including providing a mesh model; forming a plane; defining an alteration area of the plane; forming a 2D mesh on the plane including a plurality of mesh nodes independent of the mesh model nodes within the alteration area; defining a partial differential equation to be numerically solved using the 2D mesh; numerically solving the partial differential equation using said 2D mesh to obtain solved 2D mesh node values; using the solved 2D mesh node values to obtain new values for each mesh model node including the portion of the mesh model to be altered; and, graphically regenerating the design feature using the mesh model nodes including the new values to form an altered portion of the mesh model.

20 Claims, 4 Drawing Sheets

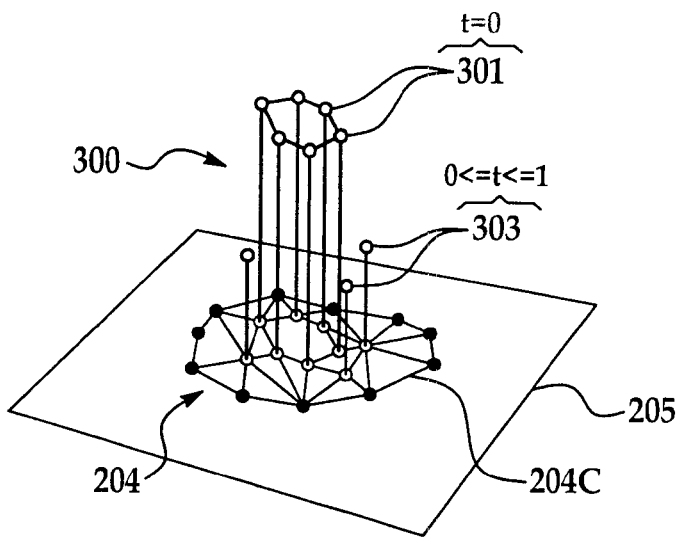
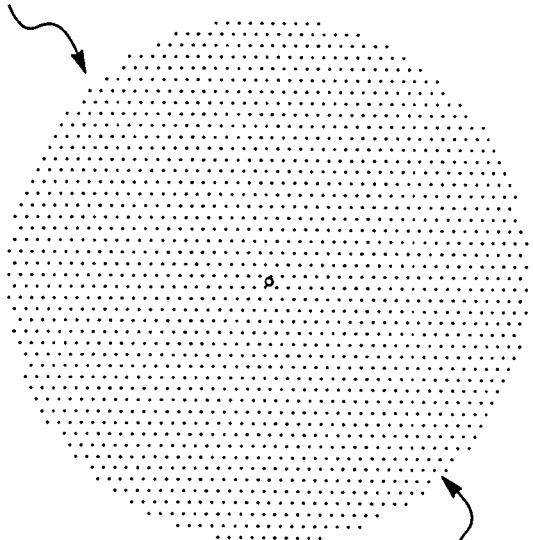
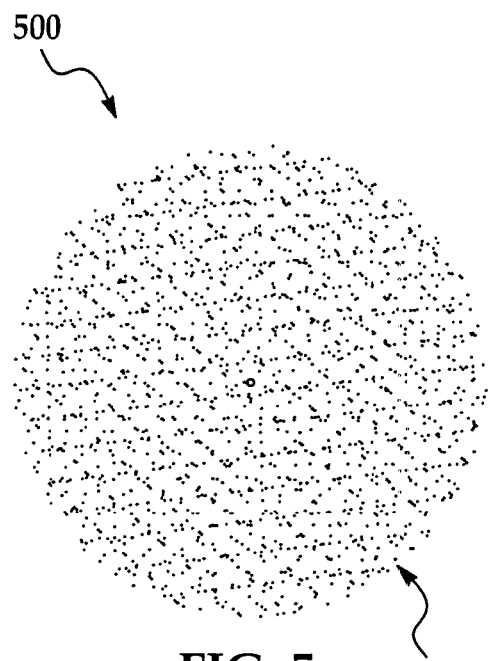
FIG. 3
FIG. 4
FIG. 5

METHOD OF ALTERING A MESH MODEL USING MODEL INDEPENDENT DIRICHLET PARAMETRIZATION

FIELD OF THE INVENTION

The present invention generally relates to mesh modeling including for use in the field of deforming a 3-D solid in Computer-Aided Engineering (CAE) analysis, and more particularly, the present invention provides a novel model-independent method using Dirichlet parametrization to allow mesh modeling including deforming existing 3D solid CAE mesh features with a selectable amount of feature smoothness and precision in boundary conditions thereby enabling selective control of 3D solid mesh deformation quality as well as selectable control of required computing time independent of an existing 3D solid CAE mesh model.

BACKGROUND

Enhanced visualization software tools have been developed that allow for interactive display and manipulation of large-scale geometric models of various products such as models developed using Computer-Aided Design (CAD). Typically a 3D geometric model in a computer-aided design (CAD) format is selected and then converted into a 3D FEA (Finite Element Analysis) mesh model which may be evaluated using a computer-aided engineering (CAE) analysis. For example, CAE simulations are advantageous in particular types of analysis, such as safety analysis and structural analysis. Examples of CAE techniques include finite element analysis (FEA) and computational fluid dynamics (CFD).

Computer aided engineering (CAE) plays an important role in manufacturing industry, particularly in automobile and aircraft industry. The use of a CAE simulation allows for verification of a design goal and a prediction of a mechanical behavior of the design, including its systems, subsystems and components.

An important feature in CAE includes mesh deformation in the simulation of mechanical behavior of a design. Traditionally, mesh deformation is achieved through deformation of the corresponding CAD model and subsequently through remeshing the modified CAD model into a new mesh model. This approach is expensive and requires CAD experts rather then CAE engineers themselves to complete the task of CAD model modification. It is, therefore, highly desirable that a CAE engineer be able to deform an existing mesh model directly. This is known as "CAD-free" morphing. Recent developments in "CAD-free" morphing techniques have enabled FEA and CFD to be used not just for analysis of the existing design but to explore better design alternatives. For this purpose various morphing techniques have been developed to change the shape of a 3-D CAE mesh model directly.

One of the key issues in mesh deformation is how to parameterize mesh nodes for their coordinated and controlled shape transformation, such as deformation. Traditionally, parametrization is achieved through a geometric operation procedure includes such operations as point projection, line/curve intersection, and domain mapping. Despite many geometric algorithms developed for this purpose, geometrical parametrization can only handle relatively simple cases of deformation.

In order to allow more complex cases of deformation, a physics-based parametrization scheme referred to as "Dirichlet Parametrization" has been applied in prior art processes. For example, Stewart et al. (US Patent Publication No. 2003/0080957), which is hereby incorporated by reference in its entirety, disclose using a using a Dirichlet parameter distribution to determine the displacement of a surface feature. In this method, 3D mesh nodes are projected by line-of-sight onto a 2D plane to form a 2D mesh which is then used to numerically to solve a 2D steady-state heat transfer problem.

However, prior art parametrization schemes including Dirichlet parametrization have been found by the present inventors to have major limitations. For example, in prior art Dirichlet parametrization approaches, where the 2D mesh required for solving the steady state heat transfer problem is obtained by projecting the mesh surface of a 3D mesh model onto a plane, has several shortcomings. One shortcoming is that nodes representing the 3-D mesh model of solid elements or elements frequently lack line-of-sight visibility from the 2D plane being parameterized (projected onto) and are therefore not accurately reproduced in the projection process. In addition, performance and accuracy of the prior art Dirichlet parametrization processes using a projected 2D mesh also depends on the density and characteristics of the 3D mesh. For example, deformation specific parameters, such as the boundary details of a deformed region, may be poorly approximated.

One method used for deformation or changing the shape of Geometric surface features in the prior art including the use of prior art Dirichlet parametrization approaches, is known as Direct Surface Manipulation (DSM), operates by interactive editing by a CAE user of surface meshes and is useful for a variety of CAE applications. DSM is capable of deforming a mesh surface region defined specifically by the user.

In DSM, an entire surface feature represented by a mesh is placed on an existing graphics generated parametric surface as a single geometric entity. After the DSM surface feature is created, a user of the system that forms the surface feature may control the location, shape and continuity of the feature independently by adjusting interactive input parameters on a real-time basis. Advantageously, DSM provides for modifications to a mesh model without relying on CAD techniques.

Various feature-driven and parametric-driven techniques are known in the art for creating a mesh feature, such as Direct Surface Manipulation, Free-Form Deformation and the like.

While existing devices and methods suit their intended purpose, the need remains for a system and method that allows improved flexibility in altering mesh surfaces including selectively controlling a computing time as well as a quality of the resulting altered mesh.

SUMMARY

The present invention provides a model-independent Dirichlet parametrization method for finite element mesh feature creation and subsequent solving to alter an existing 3D mesh model, including deforming a portion of an existing 3D mesh model, where the method is implemented as a user interactive software module within CAE (Computer Aided Engineering) software.

For example, design of a system, such as a vehicle, is achieved according to the present invention using a parametric driven design process implemented within CAE software that is embedded in computer readable form and accessible by a computer system. The CAE software may be used, for example, in the design in a vehicle or aircraft, as well as engineering analysis of the design. The model-independent Dirichlet parametrization method is incorporated as a user interactive software module within the CAE software and is interactively manipulated by a user to selectively control the density and characteristics of an independently created finite element 2D mesh (FEA mesh) used to parameterize a given 3D mesh of an already existing design feature within a computer system memory in order to subsequently alter, e.g., deform, the 3D mesh as well as the underlying design feature.

In one embodiment, a method of altering a computer generated mesh model of a design feature by a computer user to improve a feature design process is provided including providing a mesh model; forming a plane; defining an alteration area of the plane, said alteration area mapable to a portion of the mesh model to be altered; forming a 2D mesh on the plane including a plurality of mesh nodes independent of the mesh model nodes within the alteration area; defining a partial differential equation to be numerically solved using the 2D mesh; numerically solving the partial differential equation using said 2D mesh to obtain solved 2D mesh node values; using the solved 2D mesh node values to obtain new values for each mesh model node including the portion of the mesh model to be altered; and, graphically regenerating the design feature using the mesh model nodes including the new values to form an altered portion of the mesh model.

Advantageously, implementation of the model-independent Dirichlet parametrization method according to the present invention allows for flexibility in the alteration or creation of a design feature, for example in deformation of the surface of an existing feature, where the characteristics of the independently created finite element mesh are selectable to control of computing time required to alter the design feature as well as selectable to control of the preciseness and smoothness of alteration of the design feature.

These and other objects, features and advantages of the present invention will become apparent from the following detailed description and the appended drawings.

BRIEF DESCRIPTION OF THE DRAWINGS

FIG. 3 illustrates a solution temperature map of the 2D mesh solved according to an embodiment of the present invention.

FIG. 4 illustrates a 2d uniform grid mesh according to an embodiment of the present invention.

FIG. 5 illustrates a 2D triangular mesh according to an embodiment of the present invention.

DETAILED DESCRIPTION OF THE INVENTION

The method according to the present invention including the model-independent Dirichlet parametrization method is preferably implemented as a user interactive software module within existing CAE software. For example, the model-independent Dirichlet parametrization method may be implemented in a Direct Surface Manipulation (DSM) software module which allows user interactive alteration of an underlying 3D mesh model of a design feature.

Using DSM, a local region of the mesh surface can be deformed quickly and accurately by changing modifiable DSM input parameters. For example the DSM method is incorporated as a software module in a CAE software package where a user interactively calls on several other software modules to perform graphics rendering functions, numerical calculations, and to interactively define boundary conditions and areas and/or magnitudes of deformation. In addition, portions of the mesh model may be interactively moved, scaled, and reoriented. Other user interactive inputs may include mathematical and numerical inputs to control transformations including Dirichlet parametrization and associated numerical partial differential equation solvers.

For example, in a DSM software module geometric surface features represented by a 3D mesh may be altered by deforming the surface, for example, by allowing a user (designer) to add a raised feature (a bump) or an indented feature (a dimple) to an existing surface on the 3D mesh.

For example, the user bounds a feature with a closed boundary curve, and specifies an influence center, e.g., a point, an open curve or an area representing maximum displacement on a sketch plane (2D plane).

According to the present invention, the DSM method is modified by using the model-independent Dirichlet parametrization method to create a finite element mesh feature independent of the 3D mesh model which is then used to alter (e.g., deform) the 3D mesh model.

In exemplary implementation, a computer generated geometric model (3D mesh) representing a design portion of a a device, such as a vehicle, is generated through the use of conventional computer aided design (CAD), including computer aided manufacturing (CAM) and computer aided engineering (CAE) techniques.

Figure 1:
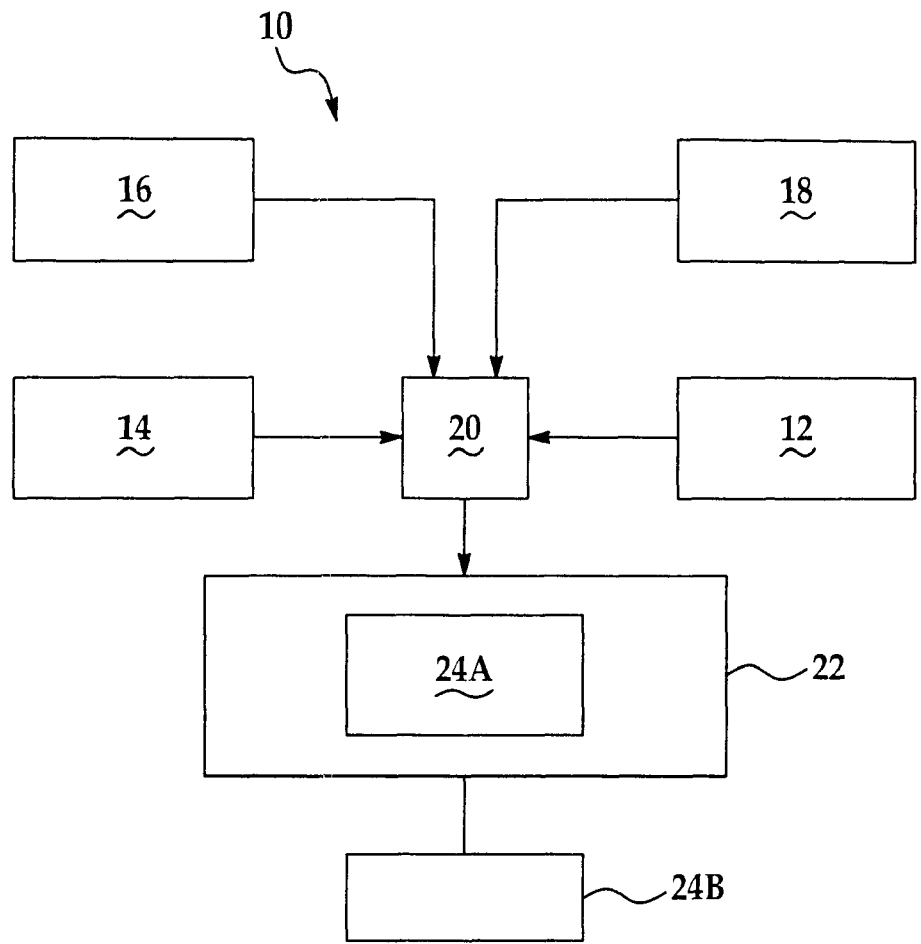
FIG. 1 illustrates a computer system for use with the method according to an embodiment of the present invention.

For example, referring to FIG. 1, a computer system 10 may include a knowledge-based engineering library 12 including data related to device design components stored on an electronic storage device (not shown) that is operatively connected to a computer 22.

The computer system 10 may further include a device library 14 stored in the electronic storage device. The device library 14 may include an electrical representation of a device model or a portion thereof. Advantageously, the device library 14 may contain a geometric model of an exterior portion of a particular device. The device library 14 may include a device electronically represented for direct surface manipulation by a DSM software module and information regarding a particular DSM feature.

The computer system 10 may also include various computer-aided design (CAD) tools 16, which can be used by the method according to the present invention. These design tools 16 may include solid modeling and visualization software. For example, in solid modeling, the computer system 10 running software operated by a user takes electronically stored device model data and standard component parts data from the knowledge-based engineering library and builds complex geometry for analysis. Several modeling programs are commercially available and generally known to those skilled in the art.

The computer system 10 may include various computer-aided engineering (CAE) analysis tools 18. One example of a CAE analysis tool 18 is computational fluid dynamics (CFD). Another example of a CAE analysis tool 20 is finite element analysis (FEA). Several software programs are commercially available to perform these analyses and are generally known to those skilled in the art.

The parametric design technique including the model-independent Dirichlet parametrization method according to the present invention may be implemented as a software module within one of the CAE analysis tools 18 and is called upon to run process 20 such as interactive operation of the model-independent Dirichlet parametrization method according to the present invention. As a particular dimension or parameter is modified, the computer system 10 may call on one or more software modules or tools to regenerate a new geometry. It will be appreciated the model-independent Dirichlet parametrization method running as interactive process 20 may call on one or more of the software modules or tools included in the computer system 10 including CAE analysis tools 18.

The computer system 10 includes a computer 22 which typically has a processor, a controller, and a memory to process information relevant for varying a design parameter such as process 20 including using direct surface manipulation (DSM) of a mesh model according to an embodiment of the present invention. The computer 22 may include a display device 24A, such as a video terminal, to display electronic and numerical representations of the design.

A user interface such as an interactive user interface 24B, a keyboard or a mouse, may be used by a user to input parameters into the computer system to allow operation of the method of the present invention including creating, displaying and manipulating mesh features including finite element mesh features created according to the present invention.

In exemplary implementation of the method according to the present invention, a model-independent finite element (FEA) mesh is created and a Dirichlet parametrization method is used to numerically solve for the temperature distribution on the finite element mesh and the resulting scalar temperature field on the FEA mesh is used for deformation of a 3D mesh using the DSM method.

For example, referring to Equation (1) is shown a second order differential equation that may be solved according to the Dirichlet parametrization method of the present invention, where (x, y) are coordinates of the plane and t is the temperature distribution.

$$\frac{\partial^2 t}{\partial x^2} + \frac{\partial^2 t}{\partial y^2} = 0 \quad \text{Equation (1)}$$

Equation (1) is a classic elliptic partial differential equation subject to the following boundary conditions:

1) temperature t(x, y)=1 at the boundary of an affected region along which no deformation will occur; and
2) temperature t(x, y)=0 at a certain areas inside the region (points, curves, or areas) where the maximum deformation will occur.

Equation (1) may be solved numerically using the finite element approach, for example using a finite element analysis (FEA) partial differential equation solver FEA accessible by the computer system 10. The results (i.e. t (x, y)) are then used as parameters (ranging from 0 to 1) for the affected mesh nodes for their coordinated and controlled manipulation, for example to create a new or altered (e.g., deformed) portion of a 3D mesh representation of a device, e.g., vehicle design. For example, when a maximum displacement is specified for nodes having t=1 values, the rest of the region can simply be deformed accordingly by scaling the maximum deformation with a normalized, single-valued, one dimensional polynomial function f (t) for which f (0)=1 and f (1)=0.

For example, Equation (1) can be solved numerically by first creating a 2D mesh by projecting a 3D mesh representation including individual mesh nodes of a design feature onto a plane to create the 2D mesh and then solving the resulting 2D mesh by the finite element method. It has been found however, that the resulting 2D mesh, which is dependent on the 3D mesh geometrical representation, suffers from two major limitations:

First, the parametrization process becomes the original 3D mesh dependent; both parametrization quality and performance depend on the structural characteristics of the projected 2D mesh (type of elements, node density, node distribution and meshing pattern) rather than geometrical characteristics of the deformation domain. This is often not a desirable consequence.

Additionally, if the finite element method implemented in the system requires a 2D mesh made of triangles, then mesh projected on the plane must be made of triangles as well. Meshes with quadrilaterals, for instance, will results in algorithmic complications, even if they are not impossible to treat.

Another dependency issue is the mesh density. A coarse original mesh may result in poor approximation to the region of deformation, especially the boundary of the deformation domain and that of the area of maximum deformation. Because boundary curves must be approximated by the 2D FEA mesh elements before being assigned boundary conditions, the quality of their approximation depends entirely on the fineness of the projected model and the number of projected nodes that happen to be located along them.

Finally, performance of an FEA solver also depends on the size of the 2D FAE mesh utilized, which has a direct connection to the original mesh. Applying the same deformation to two identical shapes, for instance, the one described by a mesh with finer resolution would require longer time to compute than the one with lesser resolution. If the model contains a large number of elements, then performance of parametrization will be greatly affected. Because the user often does not have control over the mesh density, the time needed for parametrization, therefore, becomes uncontrollable, as well.

The second limitation is related to the parallel projection that maps a 3D mesh onto a plane to form the 2D FEA mesh. In order to obtain a clean, useable mesh, the line-of-sight visibility of the 3D mesh viewed from the plane in the direction of projection must be satisfied. Any occlusion will result in overlapped elements on the plane, making the result unusable for the finite element method. In this case a unified 2D FEA mesh for interested parts is clearly necessary. Moreover, for a model made entirely of solid elements, there is no clear choice of elements for all involved. In such a case, one cannot simply project the entire solid model onto the plane and hope to obtain a clean and ready-to-use 2D mesh.

According to the method of the present invention, in order to overcome the limitations in the prior art, a separate and independent 2D mesh is created on a plane and used for solving the partial differential equation (1) according to FEA. The 2D mesh created according to the invention is independent of a 3D mesh model representation of a design feature (hereinafter referred to a model-independent 2D mesh). In addition, improved methods of interpolation to define new (altered) values of the 3D mesh are provided.

The model-independent 2D mesh allows a user to more precisely represent the boundary curves of deformation area and maximum deformation entities. The model independent 2D mesh also allows a user to produce a good quality parametrization distribution within a reasonable amount of computing (CPU) time regardless of the fineness (denseness) of the 3D model to be deformed. Further, the model independent 2D mesh also operates equally as well for parameterizing 3D mesh models made up of different types mesh elements such as meshes formed of varying geometries such as triangles, quadrilaterals, tetrahedrons, hexagons and the like.

Figure 2:
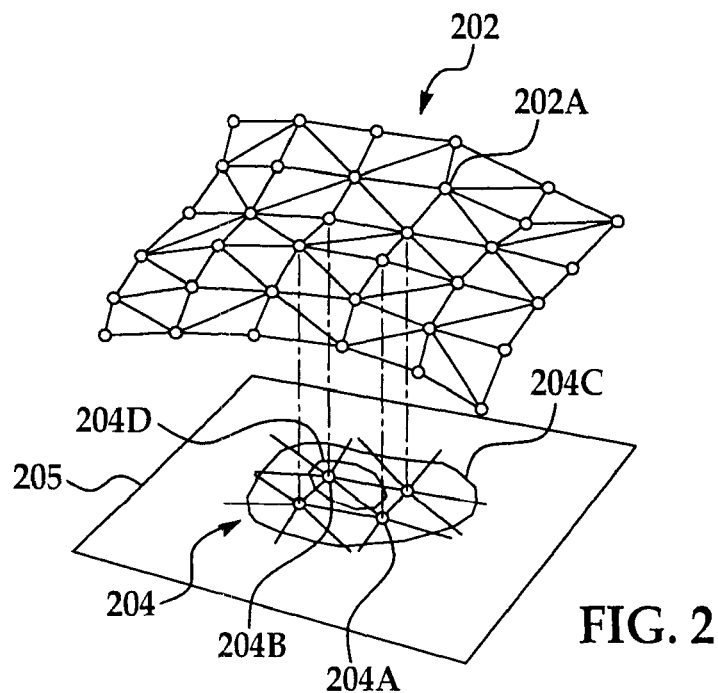
FIG. 2 illustrates a 2D mesh created according to an embodiment of the present invention.

In a first step of the method of the present invention, a deformation domain for the model independent 2D mesh is defined. For example, referring to FIG. 2 where an exemplary 3D triangular model mesh 202 is shown with mesh nodes e.g., 202A. The 3D model mesh 202 may be a portion of a vehicle design feature already existing or previously created by the CAE software included in the computer system 10. Also shown is a model-independent 2D mesh 204 created by a user on a 2D plane 205 according to the present invention and including 2D mesh nodes e.g., 204A, 204B including within and on a boundary curve 204C.

In one embodiment, the model-independent 2D mesh 204 is created relative to the 3D mesh. For example, the 2D mesh is defined by the user corresponding to a deformation domain of the 3D model mesh model i.e., by projecting a user defined deformation boundary, e.g., 204C onto the 2d plane 205. It will be appreciated that subsequently created 2D mesh nodes e.g., 204A, 204B, on the 2D plane 205 are separate and independent of the 3D model mesh model 202. The 2D mesh nodes, e.g., 204A are created within a domain comprising a user defined area (e.g., including boundary curve 204C) on the 2D mesh 204 which is additionally defined by 2D mesh nodes e.g., 204A, 204B located within the defined boundary curve 204C on the 2D plane 205.

In exemplary application, where the numerically solved partial differential equation (1) over the newly created 2D mesh (2D FEA mesh) will be used to apply a deformation to the 3D mesh model design, the boundary curve 204C (approximated by 2D mesh nodes) defines a deformation area or domain (boundary condition e.g., t=1), and a maximum deformation parameter, (e.g., boundary condition t=0 corresponding a scaled maximum solution) may be defined for one or more of the 2D FEA mesh nodes. For example, the maximum deformation parameter may correspond to a point e.g., 204B, an open curve or a closed curve, e.g., 204D approximated by the 2D mesh nodes.

In a second step of the method according to the present invention, the 2D FEA mesh 204 which will be numerically solved using FEA (finite element analysis) method is created by a user/designer, for example, within as well as on the boundary curve e.g., 204C (approximated by 2D mesh nodes) representing the deformation area. Referring to FIG. 3, the 2D FEA mesh 204 is then numerically solved using a conventional FEA numerical solver to produce a temperature distribution map 300 (solution map) which resembles a graph function defined over the 2D plane domain and shows an exemplary maximum deformation points e.g., 301 (t=0) as well as intermediate discrete solved temperature (t) values e.g., 303 ($0 \leq t \leq 1$).

For example, the mesh used to create the 2D FEA mesh preferably includes a uniform grid mesh, more preferably a triangular mesh, even more preferably, a Delaunay triangulation mesh with area constraints. In other embodiments, other mesh geometries may be used.

In one embodiment, the boundary curve of the 2D FEA mesh is defined by a control polygon and elements that fall within the boundary curve are represented by a uniform grid mesh, i.e., representing uniform spacing between perpendicular lines. Referring to FIG. 4 is shown an example of a uniform 2D grid mesh 400. The uniform grid approach is less preferred since the uniform grid suffers from the limitation that the boundary curve 401 is approximated.

In a more preferred embodiment, the 2D mesh is formed by the Delaunay triangulation method. For example, a traditional Delaunay triangulation with area constraint is used. For example, the boundary specification parameters are used to generate a point-set. The boundary curve is then tessellated, and the resulting points are added to a point-set. An influence center may be defined by the user for the deformation area, and if the influence center is defined by an open curve or closed curve, the influence center may be tessellated as well and the resulting points added to the point-set. The operation of tessellating and software routines for accomplishing the process are known in the art and preferably included in computer system 10.

If the influence center is a point, the influence center point may be added to the point-set. The resulting point-set is then used as the input to a Delaunay triangulation computing algorithm. For example, the divide-and-conquer algorithm for Delaunay triangulation, as is known in the art, may be used for triangulating the given set of points along with maximum area to produce the created 2D mesh that will then be used to solve the 2D mesh by FEA to accomplish subsequent manipulation, e.g., deformation, of the 3D model mesh. Referring to FIG. 5, is shown an exemplary resulting 2D mesh 500 created using Delaunay triangulation with a well defined boundary curve 501.

In a third step of the process according to the present invention, boundary conditions are assigned by the user for solving the 2D FEA mesh. For example, boundary condition t (x, y)=1 is assigned to all the boundary nodes of the 2D FEA mesh created. In addition, values such as t (x, y)=0 are assigned to the area of maximum deformation, which may be a point or a curve (either closed or open). If the maximum deformation area is a point, then t (x, y)=1 is assigned to that node representing the point; if the maximum deformation area is a curve, nodes that are identified as being located on the curve or near the curve within a given tolerance are assigned t (x, y)=1.

Figure 6:
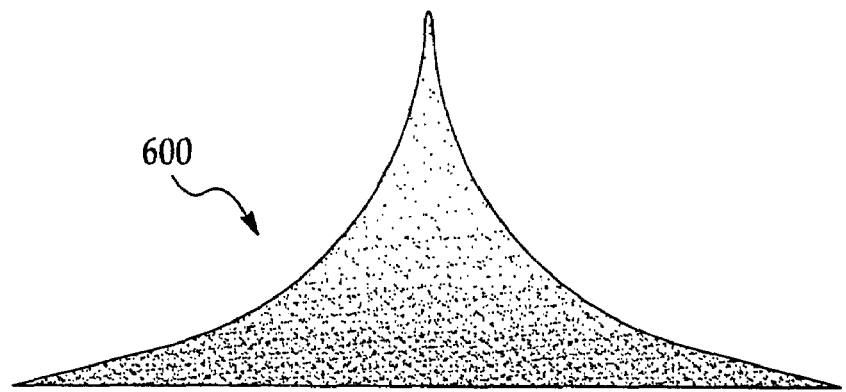
FIG. 6 illustrates a parameter distribution obtained from a relatively dense 2D mesh according to an embodiment of the present invention.
Figure 7:
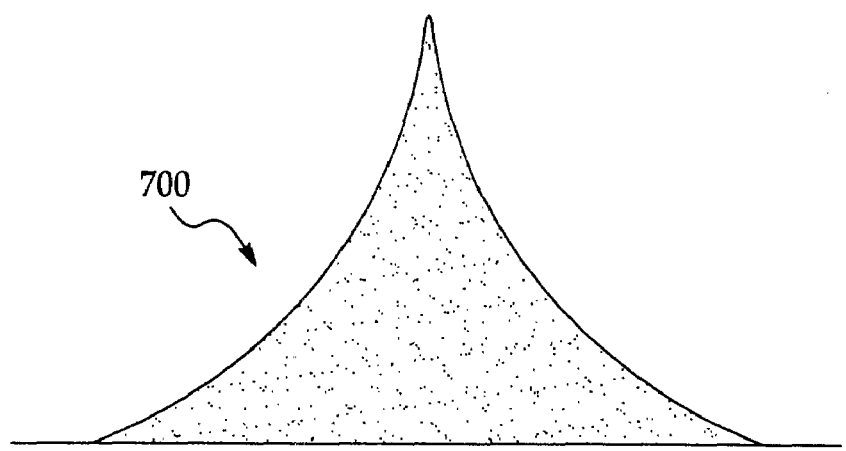
FIG. 7 illustrates a parameter distribution obtained from a relatively sparse 2D mesh according to an embodiment of the present invention.

In a fourth step of the method according to the present invention, after creating the 2D FEA mesh, the partial differential equation (1) is solved numerically by a FEA problem solver module which may be included in the computer system 10, and a discrete temperature distribution map (t values at each mesh node) is obtained such as that shown in FIG. 3. For example, several different approaches can be used to solve equation (1) numerically. For example, two of the most common known in the art include a finite element analysis (FEA) method and finite differencing (FD) method. Although any numerical method may be used including either FEA or FD, in a preferred embodiment, a finite element analysis method is preferred because it is less sensitive to the variation in size (density) of the mesh nodes. For example, a standard Galerkin approach, as is known in the art, with triangular surface elements and linear blending functions is used to solve a resulting linear system of equations derived from equation (1) as represented by Equation (2).

$$KT=R \qquad \text{(Equation 2)}$$

Where K is the conduction matrix, T is the vector of parameter values t at each of the finite element nodes. The vector R is the heat load vector, which in the case of Dirichlet boundary conditions is the zero vector. Both K and R are modified to handle the prescribed parameter values on the boundary and influence center nodes. Gaussian elimination may be used to solve the system of equations and obtain a parameter distribution for all of the 2D mesh nodes. For example, FIG. 6 shows a graphical representation of the parameter distribution 600 on the 2D mesh. FIG. 7 shows the parameter distribution 700 when a sparse (less dense) 2D mesh is used.

In a final step, an interpolation technique, which in some embodiments may include any interpolation technique known in the art, is then used to evaluate/determine a temperature value for each node of the 3D mesh model portion affected. In a preferred embodiment, the 2D mesh is triangular and the interpolation technique includes interpolating the value of a point within or on the triangle. For example, a parameter value for each node of the 3D mesh model portion affected is determined by projecting the underlying (3-D) mesh nodes onto the 2D mesh created to form a graphical point of intersection and interpolating a parameter value for the point of intersection based on the previously determined parameter values at the nearest surrounding 2D mesh nodes, e.g., nodes forming the vertices of a surrounding triangle.

Figure 8:
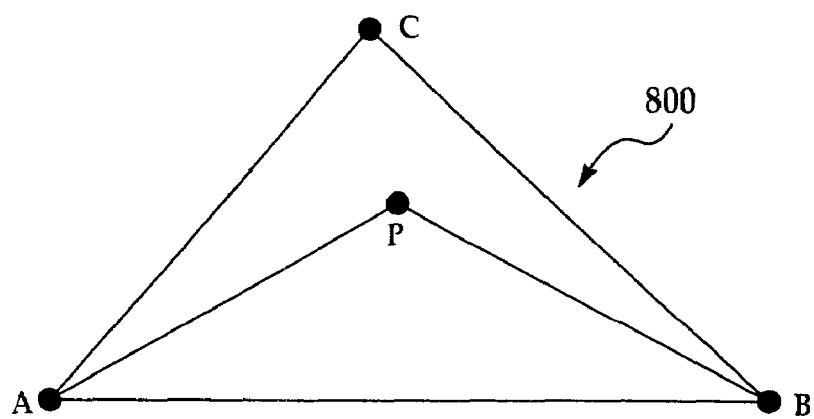
FIG. 8 illustrates an intersecting point formed within a triangle which is interpolated to transform a 3D mesh model according to an embodiment of the present invention.

For example, the final step includes the user graphically constructing rays passing through the nodes of the 3D mesh in the direction of the 2D plane normal. For example, a hardware graphics engine being part of the computer system 10 may be used to construct the rays and determine whether and where they intersect within the 2D FEA mesh created according to the present invention. If the 2D FEA mesh is intersected by the rays, an intersecting point within or on the triangle of the 2D FEA mesh are used to interpolate a value for the intersecting point which is then used to assign a parameter value for a corresponding 3D mesh node. For example, FIG. 8 shows an intersecting triangle 800 on the 2D mesh for which the solved temperature values at its three vertices (A, B and C) are used to interpolate the temperature value at the intersection point P, which corresponds to a corresponding 3D mesh node.

For example, in one embodiment, the parameter values for point P may be easily determined by linear interpolation techniques knowing the parameter values at three vertexes (A, B and C). In other embodiments, non-linear interpolation methods may be used. Thus parameter values for all the 3D mesh nodes which intersect the 2D mesh inside the deformation boundary may be assigned.

It will be appreciated that the quality of the 3D mesh feature transformed using interpolated parameter values for intersecting 3D mesh nodes is affected by the density of the 2D mesh created according to the present invention and used to numerically solve the partial differential equation (1 or 2) using the Dirichlet parametrization method. For example, it will be appreciated that using a denser 2D FEA mesh (nodes having a smaller spacing between nodes) will improve the quality (have more information) of the resulting parameter distribution and thus the quality of the subsequently transformed (deformed) 3D mesh feature. Likewise, using a sparser (less dense 2D FEA mesh) will result in poorer quality (less information). However, the density the 2D FEA mesh also determines the computing time required. Thus, the designer use may flexibly determine the computing time as well as the desired quality of the resulting parametrization subsequently used for alteration (deformation) of 3D mesh representation of a design feature.

In another aspect of the invention, a higher quality or smoother parameter distribution is created using a preferred interpolation technique; particularly where a relatively sparse 2D FEA mesh is created and used according to the present invention.

According to one aspect of the invention, an interpolating surface is created using triangular Bezier patches to interpolate each of the triangular elements.

Figure 9:
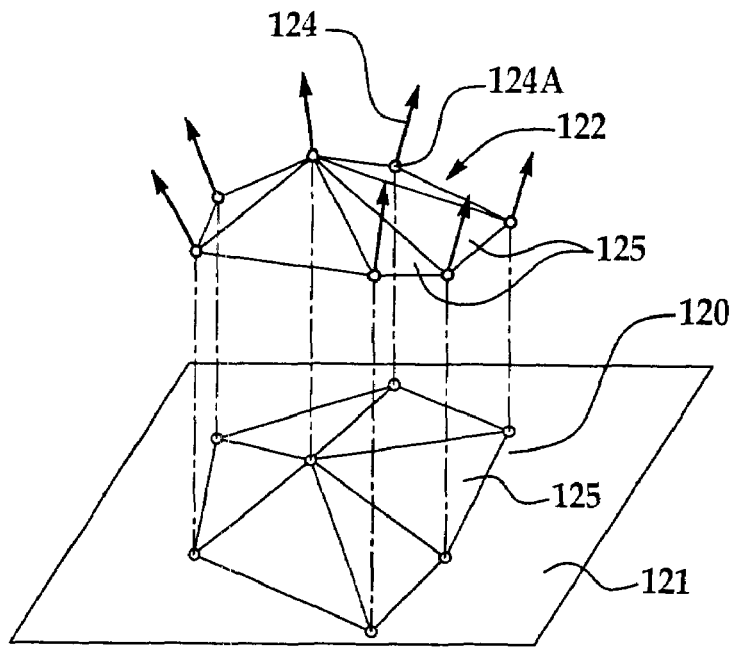
FIG. 9 illustrates a 3D triangular mesh surface created from a 2D triangular mesh which is then used to create Bezier patches to interpolate a point intersecting the 2D triangular mesh to transform a 3D mesh model according an embodiment of the present invention.

For example, referring to FIG. 9, a 2D triangular FEA mesh 120 on 2D plane 121, when t is added, is transformed into a 3D mesh 122 and a normal vector e.g., 124 may be graphically and numerically constructed at each of the nodes, e.g., 124A. Since the normal vector e.g., 124 is shared by neighboring triangles, e.g., 125, the triangles including the normal vectors e.g., 124 may be utilized to achieve a smoother interpolation. For example, the triangles, e.g., 125 may be used to further construct cubic order or higher (e.g., quartic) triangular Bezier patches which are then used to interpolate points of intersection from graphically constructed rays from a 3D mesh model passing through the transformed 3D mesh 122 surface within or on the triangular elements e.g., 125 as previously discussed.

The parameter distribution (interpolated values) for the 3D mesh nodes obtained by using cubic order (or higher) Bezier triangular patches has been found to be much smoother (more precise with more information) when this method is used for interpolation compared to linear interpolation methods.

Figure 10:
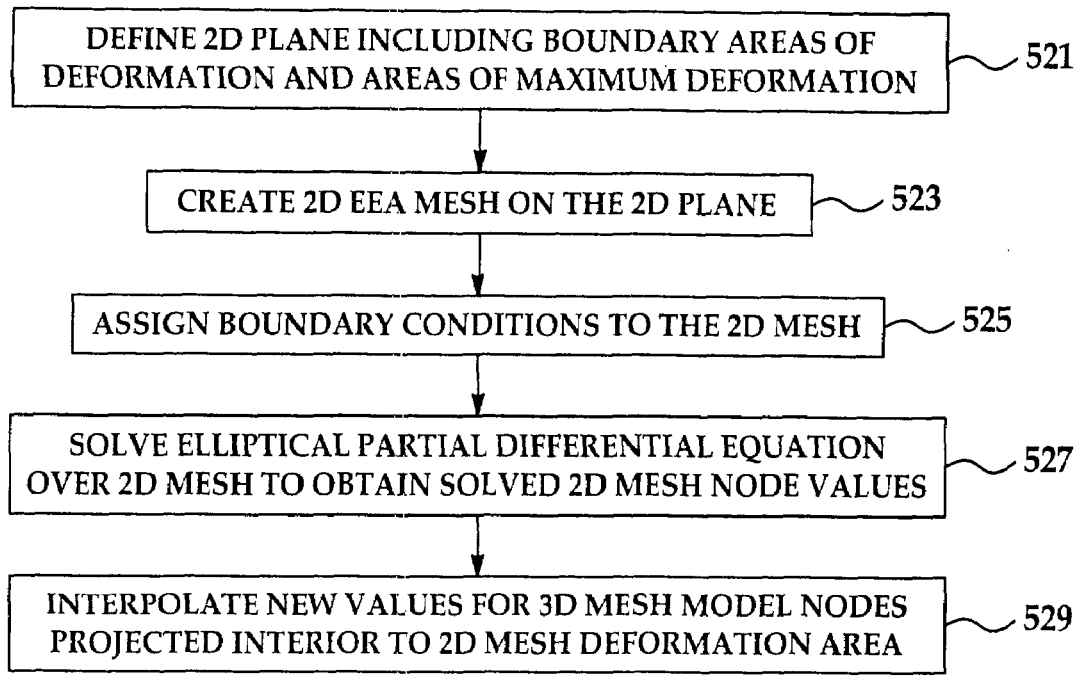
FIG. 10 illustrates process steps according to embodiments of the present invention.

Referring to FIG. 10 is shown the process steps as explained above according to embodiments of the present invention. In step 501 a 2D plane is defined including defining deformation area boundary curve, and points or areas of maximum deformation. In step 503, a 2D mesh (e.g., a FEA mesh) is created on the plane. In step 505, boundary conditions are assigned to the 2D mesh. In step 507, an elliptical partial differential equation (equation (1)) is solved over the 2D mesh using FEA to obtain t values for each of the 2D mesh nodes. In step 509, t values are obtained (interpolated) for each of the 3D mesh nodes projected interior to the 2D mesh boundary curve (deformation area).

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A method of altering a computer generated mesh model by a computer user to improve a design, said method comprising a computer executing programmed instructions stored in computer readable memory, said method comprising:

providing a mesh model comprising a plurality of mesh model nodes as a first software generated graphical and numerical representation of said design;

forming and positioning a plane with a geometric relationship to the mesh model as a second software generated graphical and numerical representation;

defining an alteration area on the plane to be mapped into an alteration area on the mesh model;

forming a 2D (2-dimensional) mesh on the plane comprising a plurality of mesh nodes within the plane alteration area, said 2D mesh created independently and without projection of the mesh model;

defining a partial differential equation to be numerically solved using the 2D mesh on the plane;

numerically solving the partial differential equation using said 2D mesh to obtain solved mesh node values;

using the solved mesh node values to obtain new values for each mesh model node comprising the mesh model alteration area; and graphically regenerating the design using the mesh model nodes comprising the new values to form an altered portion of the mesh model comprising the desired alteration area.

2. The method of claim 1, wherein the step of numerically solving comprises assigning boundary conditions to the 2D mesh on the plane.

3. The method of claim 2, wherein the boundary conditions include user assigned values at the boundary of the alteration area on the 2D mesh and at areas, curves or points representing regions of maximum alteration of the alteration area.

4. The method of claim 1, wherein said altered portion comprises a deformed portion of said mesh model.

5. The method of claim 1, wherein said partial differential equation is an elliptical partial differential equation.

6. The method of claim 5, where said partial differential equation represents a solution to 2-dimensional steady state heat transfer on said plane.

7. The method of claim 1, wherein said step of numerically solving is selected from the group consisting of a finite element method and a finite differencing method.

8. The method of claim 1, wherein said step of using the solved mesh node values to obtain new values for each mesh model node comprises graphically projecting each mesh model node to form a point of intersection within the alteration area of the plane and using the solved mesh node values to determine new values for each mesh model node.

9. The method of claim 8, wherein using the mesh to determine new values for each mesh model node comprises interpolation of said point of intersection based on said solved mesh node values surrounding said point of intersection.

10. The method of claim 9, wherein said interpolation comprises interpolating a triangular area comprising said 2D mesh.

11. The method of claim 10, wherein said interpolation comprises interpolating triangle Bezier patches comprising said triangular area.

12. The method of claim 1, wherein said 2D mesh consists of a uniform grid.

13. The method of claim 1, wherein said 2D mesh consists of a plurality of triangles.

14. The method of claim 1, wherein said 2D mesh consists of a plurality of triangles formed by Delaunay triangulation.

15. A method of deforming a computer generated mesh model of a design by a computer user to improve the design, said method comprising a computer executing programmed instructions stored in computer readable memory, said method comprising:
  providing a mesh model comprising a plurality of mesh model nodes as a first software generated graphical and numerical representation of said design;
  forming a plane as a second software generated graphical and numerical representation;
  forming a user defined deformation area on the plane, said deformation area able to be mapped to a portion of the mesh model to be deformed;
  forming a user defined 2D (2-dimensional) mesh comprising a plurality of mesh nodes, said 2D mesh created independently and without projection of the mesh model, said 2D mesh on said plane within the deformation area;
  selecting an elliptical partial differential equation to be numerically solved using the 2D mesh;
  numerically solving the elliptical partial differential equation using said 2D mesh to obtain solved mesh node values for each of said plurality of mesh nodes;
  graphically projecting each mesh model node to form a point of intersection on the deformation area of the plane and using the solved mesh node values to determine new values for each mesh model node corresponding to said point of intersection; and
  graphically regenerating the design using the mesh model nodes comprising said new values to form a deformed portion of the mesh model.

16. The method of claim 15, wherein the step of numerically solving comprises assigning boundary conditions to the 2D mesh, said boundary conditions comprising user assigned values at the boundary of the deformation area and at areas or points of maximum deformation of the deformation area.

17. The method of claim 15, wherein said step of numerically solving is selected from the group consisting of a finite element method and a finite differencing method.

18. The method of claim 15, wherein said step of using the solved 2D mesh node values to obtain new values for each mesh model node comprises graphically projecting each mesh model node to form a point of intersection within the deformation area of the plane and using the solved mesh node values to determine new values for each mesh model node.

19. The method of claim 15, wherein using the 2D mesh to determine new values for each mesh model node comprises interpolation of said point of intersection based on said solved mesh node values surrounding said point of intersection.

20. A method of deforming a computer generated mesh model of a design feature by a computer user to improve a feature design process, said method comprising a computer executing programmed instructions stored in computer readable memory, said method comprising:
  providing a mesh model comprising a plurality of mesh model nodes as a first software generated graphical and numerical representation of said design;
  forming a plane as a second software generated graphical and numerical representation;
  defining a deformation area on the plane, said deformation area mappable to a portion of the mesh model to be deformed;
  forming a mesh comprising a plurality of mesh nodes, said mesh created independently and without projection of the mesh model, said mesh on said plane within the deformation area;
  defining an elliptical partial differential equation to be numerically solved using the mesh;
  assigning boundary conditions wherein the boundary conditions comprise assigned values at the boundary of the deformation area and at areas or points of maximum deformation of the deformation area;
  numerically solving the elliptical partial differential equation using the mesh to obtain solved mesh node values;
  graphically projecting each mesh model node to form a point of intersection on the deformation area of the plane and using the solved mesh node values to determine new values for each mesh model node corresponding to said point of intersection; and
  graphically regenerating the design feature using the mesh model nodes comprising the new values to form a deformed portion of the mesh model.

* * * * *